T. Goodrum.
Book Support.
No. 3,141. Reissued Sept. 29, 1868.
FIG 1 Top View.
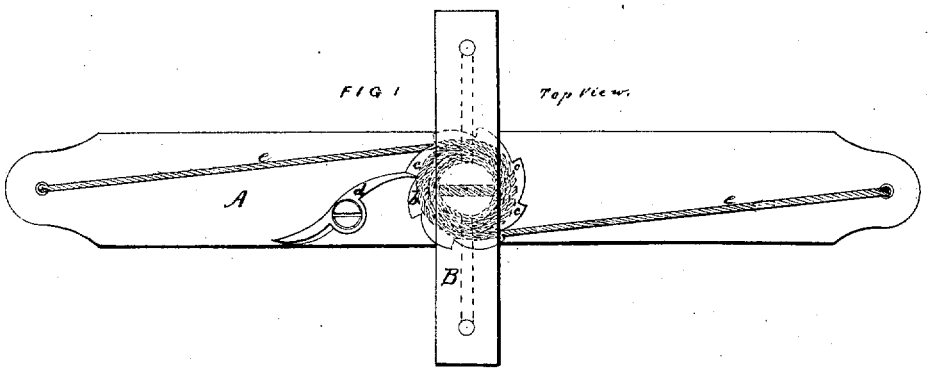
FIG 2 Elevation.
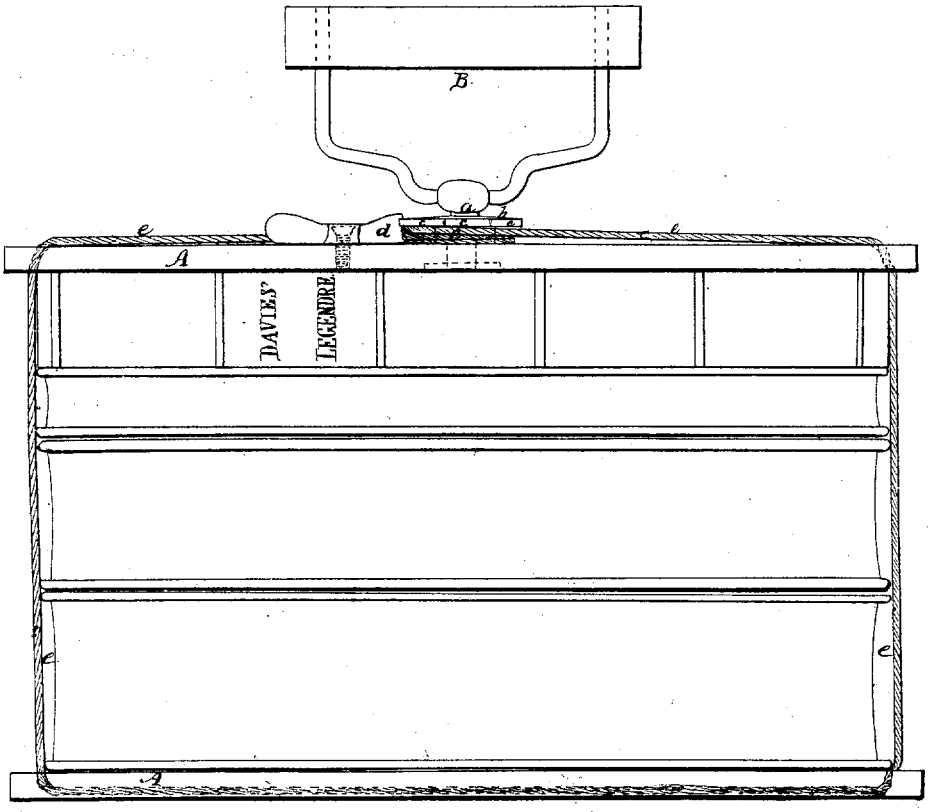
Witnesses
Benj F. Thurston
John D. Thurston
Inventor
Thomas Goodrum
N. PETERS, PHOTO-LITHOGRAPHER, WASHINGTON, D. C.

United States Patent Office.

ALBERT J. MANCHESTER, OF PROVIDENCE, RHODE ISLAND, ASSIGNEE OF THOMAS GOODRUM, OF SAME PLACE.

*Letters Patent No.* 58,940, *dated October* 16, 1866; *reissue No.* 3,141, *dated September* 29, 1868.

IMPROVEMENT IN PORTABLE BOOK-CLAMPS.

The Schedule referred to in these Letters Patent and making part of the same.

TO ALL WHOM IT MAY CONCERN:

Be it known that THOMAS GOODRUM, of the city and county of Providence, in the State of Rhode Island, has invented a new and improved School-Boy's Book-Package Binder; and it is hereby declared that the following specification, taken in connection with the drawings making a part of the same, is a full, clear, and exact description thereof.

Figure 1 is a top view.

Figure 2 is a side view, as the article will appear when in use.

School-boys have long been accustomed to bind together, in a package, the books which are required to be carried to and from school, by means of a leather strap, provided with a buckle at one end, through which the other end of the strap is passed. As it is necessary to draw the strap tightly around the books, to prevent them from slipping out, it follows that the covers of the books, at the top and the bottom of the package, are soon broken at the edges, and defaced. To provide a convenient article for this purpose, which will hold the package together with perfect safety, and without injury to the books, is the object of my invention. And such invention consists in the employment of a pair of binding-strips, forming a clamp, between which the package of books is to be placed, and which clamp is made to compress the package from the effect of winding a cord, suitably connected with such strips, upon a windlass-barrel, attached to it, and forming a part of the apparatus.

In the accompanying drawings, A A are respectively strips of hard wood, (for which any other suitable material may be substituted,) of a convenient length to accommodate the ordinary sizes of books. To the upper strip, and midway between the ends, is attached a convenient handle, B, to the shank of which is secured a windlass-barrel, C. The shank, *a*, of the handle, passes through the strip, and may be riveted, over a collet upon the under side, or otherwise arranged, so that it can be turned freely. There is also at the upper end of the windlass-barrel, and furnishing a flanch to retain the cord presently to be described, a plate, *b*, which is provided with ratchet-teeth, *c*, and in connection with such teeth is a holding-dog or stop, *d*, arranged in any usual and convenient way. The two strips or binders A A are connected, by means of a cord, *e*, which is passed through holes near the ends of the strips, which it will be better to shape and round at the edge, like hawse-holes, and is finally secured at both ends to the barrel of the windlass.

It is quite obvious, that, with the proper length of cord, the two binding-strips A A can be separated from each other, to permit the introduction of the number of volumes to be carried, which, when properly adjusted, by turning the handle B, the cord *e* will be wound upon the windlass-barrel, and cause the binders A A to compress the books sufficiently to keep them in place, where they will be held, by means of the engagement of the holding-dog *d* with one of the teeth of the ratchet-plate *b*.

It is not necessary that the cord *e* should be a single cord, as shown in fig. 2, and be led lengthwise along the bottom surface of the lower binder, but it may be cut in two, and be secured, at the ends, to the extremities of the lower binder. It is, however, much better that the arrangement should be as shown, for by this means any stretching of the cord is distributed equally throughout its length, and the binders are made to press upon the outside books, with equal force, at all points of their surfaces.

What is claimed as the invention of the said THOMAS GOODRUM, and is desired to be secured by Letters Patent, is—

1. A portable book-package binder, having the following elements in combination: The clamps A A, a tightening-cord *e*, and windlass C, provided with a ratchet-plate and pawl, or equivalent holding-device, substantially as described.

2. The compound handle B and windlass-barrel C, in combination with the top binding-strips A, substantially as described.

ALBERT J. MANCHESTER.

Witnesses:

BENJ. T. THURSTON,

HENRY S. HART.